Sept. 27, 1932.　　　F. K. MOODY　　　1,879,404
TIRE INFLATER
Filed June 30, 1930
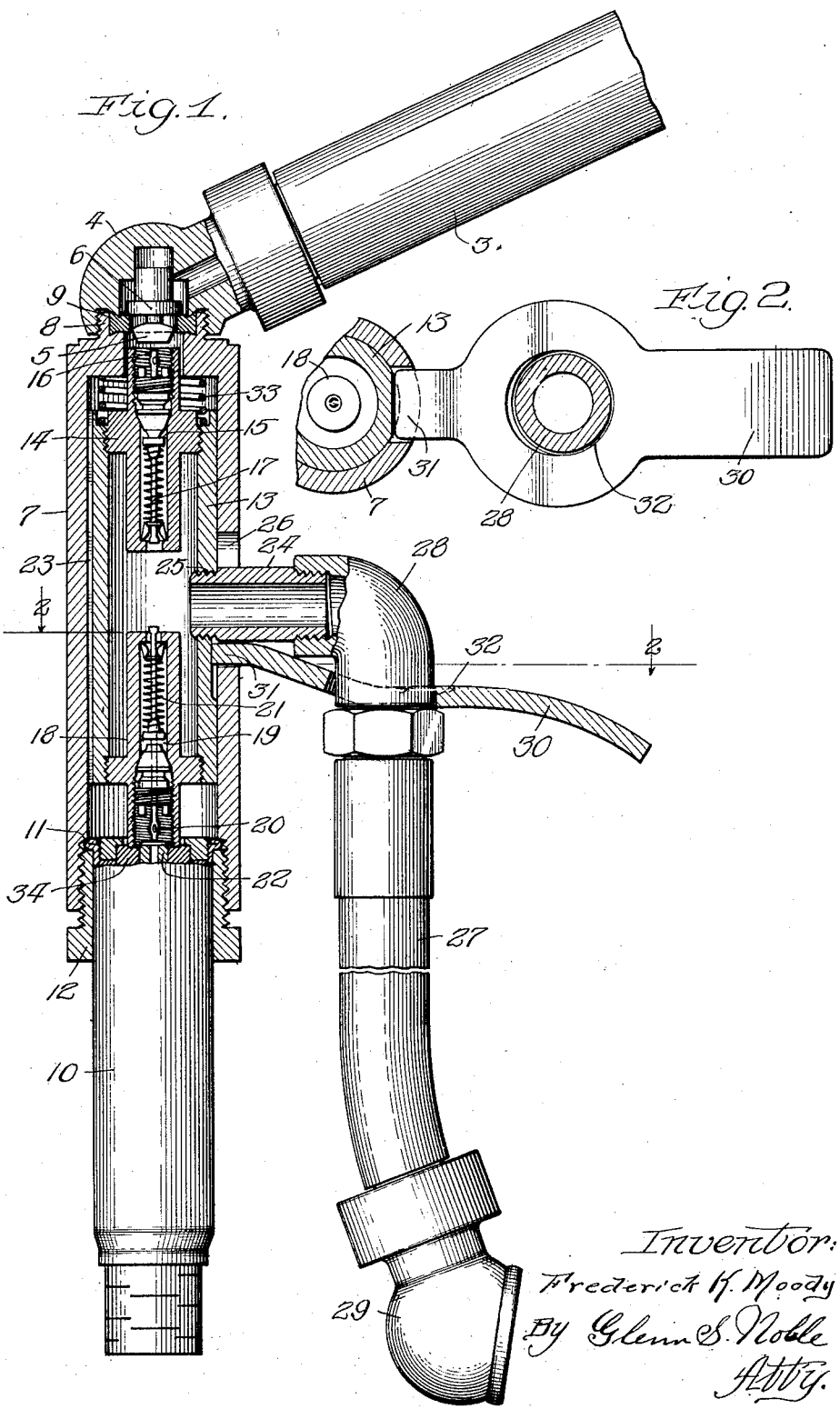

Patented Sept. 27, 1932

1,879,404

UNITED STATES PATENT OFFICE

FREDERICK K. MOODY, OF CHICAGO, ILLINOIS

TIRE INFLATER

Application filed June 30, 1930. Serial No. 465,002.

This invention relates to means for inflating and testing the pressure in pneumatic tires. In accordance with this invention I provide means to be attached to the hose from an air pump or source of compressed air and having a connection for the tire chuck, the arrangement being such that when the chuck is applied to the tire air may be shut off and connection made from the tire to a suitable tire gauge for determining the pressure in the tire.

The principal object of this invention is to provide a device of this character which will be comparatively simple in construction and more or less made of standard or well-known parts and which will be convenient to operate and in the event of injury may be readily repaired.

Other objects of this invention are to provide a combined control valve and pressure gauge; to provide an inflater which may be readily manipulated to permit air to pass to the tire and then adjusted to shut off the air from the supply and connect the tire with a tire gauge, which gauge may be readily positioned for convenience in reading; and to provide such other advantages and improvements in construction as will appear more fully from the following description.

In the accompanying drawing illustrating this invention;

Figure 1 is a side view with parts broken away to show the inner construction; and Figure 2 is a cross sectional view taken on the line 2—2 of Figure 1.

As shown in this drawing, the pipe or hose 3 which leads from the pump or source of supply is provided with a chuck or connection 4 which is preferably the same as those ordinarily used for making a connection from the hose to the tire valve. This chuck is provided with a movable valve 5 and valve seat or washer 6 of the character usually provided for the same. A cylinder 7 has a reduced threaded end 8 which engages with the threaded opening in the chuck or connector and has a bead 9 which coacts with the washer 6 of the chuck to make a tight closure similar to the usual chuck arrangement. The opposite end of the cylinder 7 is provided with a tire gauge 10 of any suitable or well-known form of construction. In the arrangement shown, the flanged end of the gauge rests against a shoulder 11 at the bottom of a threaded recess in the end of the cylinder and is held in position by a gland or nut 12 which provides a tight connection between the cylinder and the gauge.

A slidable or reciprocable tube 13 is mounted in the cylinder 7. This tube is threaded at its upper end to receive a hollow plug or valve cage 14 in which is mounted a tire valve 15 which is of the construction commonly used for tires and which has a stem 16 by means of which it may be opened against the pressure of the spring 17. The upper end of the cage is reduced as shown and coacts with the valve 5 to raise it off its seat in a similar manner as when the chuck is applied to a tire stem, and to make a tight joint with the washer or valve seat 6.

The opposite or lower end of the tube 13 is threaded to receive a similar hollow plug or valve cage 18 in which is mounted a tire valve 19 having a stem 20 and closing spring 21. The stem 20 coacts with the center anvil or opening member 22 of the tire gauge 10 and the stem 16 may coact with the valve or opening member 5 in the chuck 4. The tube 13 may be provided with a longitudinal slot 23 in the side thereof to permit air to pass freely past the same.

A threaded coupling 24 engages with a tapped hole 25 in the side of the tube 13 and projects out through a slot 26 in the side of the cylinder 7. A hose 27 is connected to the coupling or nipple 24 by means of an elbow 28. This hose has a chuck 29 at the end for making connection to the tire.

An operating lever 30 has its inner end 31 fulcrumed on the lower edge of the slot 26 and is provided with a hole 32 which fits over the elbow 28 thereby holding the lever in position.

When a tire is to be inflated, the user applies the chuck or connector 29 to the tire valve and then raises the outer end of the trigger or lever 30 which engages with the elbow 28 and moves the nipple or coupling 24 and tube 23 upwardly so that the valve projection on the cage 14 engages with the valve 5 thereby opening the valve and permitting air to pass through the valve cage or plug 14 into the tube 23. The air then passes from the tube through the connections and hose 27 to the tire. When the user thinks that the tire is about filled to the proper pressure, he releases the lever 30 thereby permitting the tube 23 to be pressed downwardly to normal position under the action of a spring 33 which is interposed between the upper end of the tube 23 and the closed end of the cylinder 7. When this occurs, the lower end of the valve cage or plug 18 engages with the usual rubber washer or gasket 34 in the end of the tire gauge 10 thereby making a tight joint between these parts. The valve stem 20 also engages with the stop or abutment 22 thereby opening the valve 19 which provides access or a passageway from the tube 23 to the tire gauge 10. The valve 15 is simultaneously closed by the spring 17 so that the air cannot escape from the tube 23. When this is done it will be seen that the tire gauge is in direct communication with the tire so that the pressure of the air in the tire may be accurately determined particularly as the connecting hose from this device to the tire would preferably be comparatively short. If the pressure in the tire is sufficient, the chuck 29 may then be removed or if more air is required the above steps may be repeated.

While the drawing shows a preferred form of my invention, changes may be made in order to adapt it to different types of tire gauges or for different conditions and therefore I do not wish to limit myself to the exact construction herein shown and described except as specified in the following claims, in which I claim.

1. In a tire inflater, the combination of a chuck having the usual check valve and packing washer, a cylinder having one end connected with the chuck, a pressure gauge at the opposite end of the cylinder having the usual packing member around the inlet thereof and a valve depressor, a movable hollow member within the cylinder having valves at either end thereof with projecting operating stems, one of said valves being adapted to coact with the check valve of the chuck for opening the same and the other with the depressor of the pressure gauge, means for actuating said movable hollow member to cause the respective valves at the ends thereof to be opened when said movable hollow member is moved in the corresponding direction, means at the ends of said movable hollow member to make tight contact with said packing washer and said packing member respectively, and means for making a connection from said movable hollow member to the tire.

2. In a device of the character set forth, the combination of a chuck having a check valve with a projecting operating stem, a packing member surrounding said stem, a cylinder having one end engaging with the chuck, a tire pressure gauge at the opposite end of the cylinder and having an exposed packing member around the inlet thereof and a valve depressor, a reciprocable tube mounted in the cylinder, plugs in the ends of said tube, oppositely disposed valves arranged in said plugs for controlling passage of air therethrough and having valve stems, one of said plugs being adapted to coact with the check valve of the chuck to open the same and also being adapted to make air tight contact with said packing member and the other being adapted to coact with the packing washer of the tire gauge to make a tight closure, the corresponding valve stem being actuated by the depressor to open the valve, means for reciprocating the tube whereby communication may be established from the hose to the tube or from the tube to the gauge and means for connecting the tube to a tire.

3. In a tire inflater, the combination of a connecting member having a check valve therein, having a projecting operating stem surrounded by a packing member, a cylinder secured to the connectinng member, a pressure gauge mounted at the opposite end of the cylinder and provided with an exposed packing member around the inlet thereof and a valve depressor, a tube slidably mounted in the cylinder, a closure for one end of the tube having a projection for engagement with the stem of the valve in the connecting member to open the same and make airtight contact with the packing member when the tube is moved in one direction, said closure having a passageway therethrough with an inwardly opening check valve for controlling the same, a closure at the opposite end of the tube having a projection for making a tight connection with the gasket of the pressure gauge, said closure having a passageway therethrough, an inwardly opening check valve having a projecting operating stem for controlling said passageway, a spring tending to hold the tube in normal position with the last named valve held open by contact of the operating stem with the valve depressor of the pressure gauge, a nipple projecting from the tube through a hole in the cylinder, an elbow engaging with said nipple, a hose connected with the elbow and adapted to be connected with a tire, and a lever coacting with the cylinder and the tube for moving the tube against the pressure of the spring.

4. In a device of the character set forth, the combination of a casing having a valve controlled inlet at one end thereof, a reciprocable closed member mounted in said casing, valves in either end of said member, means for reciprocating said member, means at one end of said reciprocable member for opening said inlet valve and making a tight connection with the inlet when said member is moved in one direction, a pressure gauge secured to said casing and having the usual packing and valve actuating means adapted to coact with the valve and valve cage at the other end of said reciprocable member when said member is moved in the opposite direction to permit air to pass from said reciprocable member to the tire gauge, and a conduit leading from said member.

FREDERICK K. MOODY.